United States Patent [19]

Iwasaki

[11] Patent Number: 4,915,337

[45] Date of Patent: Apr. 10, 1990

[54] FLEXIBLE CUP HOLDER

[76] Inventor: Mark H. Iwasaki, 739 Hausten St. #901, Honolulu, Hi. 96826

[21] Appl. No.: 319,767

[22] Filed: Feb. 17, 1989

[51] Int. Cl.$^4$ ................................................. A47K 1/08
[52] U.S. Cl. ................................... 248/311.2; 224/901
[58] Field of Search .................. 248/311.2, 312, 312.1, 248/313, 310, 316.1, 215, 205.2, 103, 104; 224/901, 148, 253, 250, 42.45 R

[56] References Cited

U.S. PATENT DOCUMENTS

| | | | |
|---|---|---|---|
| 2,279,442 | 4/1942 | Burns et al. | 248/311.2 |
| 2,864,575 | 12/1958 | Stewart | 248/313 X |
| 4,057,757 | 11/1977 | Warden | 224/901 |
| 4,109,985 | 8/1978 | Lieb, Jr. | 248/311.2 X |
| 4,387,873 | 6/1983 | Pavlo et al. | 248/311.2 X |
| 4,420,104 | 12/1983 | Wilenno | 224/253 X |
| 4,606,523 | 8/1986 | Statz et al. | 248/311.2 |
| 4,634,089 | 1/1987 | Wright et al. | 248/311.2 |
| 4,655,425 | 4/1987 | Wallace et al. | 248/311.2 |
| 4,678,154 | 7/1987 | McFarland | 248/311.2 |
| 4,718,623 | 1/1988 | McClure | 248/205.2 X |
| 4,759,963 | 7/1988 | Uso, Jr. et al. | 248/205.2 X |
| 4,767,092 | 8/1988 | Weatherly | 248/311.2 |
| 4,793,394 | 12/1988 | Cohen | 248/311.2 X |
| 4,848,625 | 7/1989 | Lucia | 224/250 |

*Primary Examiner*—J. Franklin Foss
*Attorney, Agent, or Firm*—Henderson & Sturm

[57] ABSTRACT

A generally flexible cup holder (10) that will securely engage both tall tapered cups (101) as well as generally cylindrical containers (102) wherein the cup holder (10) includes a pair of horizontally disposed support arms (20) that will encircle the periphery of a tapered cup (101) as well as a cylindrical container (102); and, an elongated flexible strap member (18) that is adapted to pass beneath a cylindrical container (102) and be operatively engaged with the joined support arms (20).

5 Claims, 1 Drawing Sheet

FLEXIBLE CUP HOLDER

TECHNICAL FIELD

The present invention relates to cup holders in general, and more specifically to the type of cup holders that are normally installed in the window wells of vehicles.

BACKGROUND OF THE INVENTION

This invention was the subject matter of Document Disclosure Program Registration No. 192,649 which was filed in the U.S. Patent and Trademark Office on May 9, 1988.

As can be seen by reference to the following U.S. Pat. No's.: 4,655,425; 4,678,154; 4,634,089; and, 4,606,523 the prior art is replete with myriad and diverse arrangements for suspending a drinking receptacle from the interior of a vehicle.

While all of the aforementioned prior art devices are more than adequate for the basic purpose and function for which they have been specifically designed, these prior art constructions are equally deficient in a number of salient respects.

To begin with, virtually all of the prior art patents involve structures that just by nature of their design and construction occupy an undue amount of storage space in a vehicle when they are not in use; and, they also have a tendency to snag on the vehicle occupants person when the holders are empty but still in place on the vehicle interior.

In addition, virtually all of the aforementioned constructions are more suited for holding generally cylindrical drink containers than they are for supporting tall tapered drink receptacles, particularly when the tapered receptacles are full. With regard to this last problem, a tapered drinking receptacle has an inherent instability when it is full due to a high center of gravity and a relatively narrow bottom support surface. Consequently, those prior art patents that provide a rigid base support for the bottom of the drinking receptacles fail to compensate for the height and instability that are found in tapered drinking cups; or, if they do take this problem into consideration in their design, they are then not particularly well suited for the conventional shorter cylindrical cans that most liquid refreshments are packaged in.

As a consequence of the foregoing situation, there has existed a longstanding need among users of drinking receptacle holders for a flexible and foldable drinking receptacle holder that is equally effective in holding either a short conventional can or a tall tapered cup in a safe secure manner; and, the provision of such a device is a stated objective of this invention.

Summary Of The Invention

Briefly stated, the generally flexible cup holder that forms the basis of the present invention comprises in general: a rigid support unit; a flexible horizontal support unit; and, a flexible vertical support unit.

The rigid support unit comprises in general: a relatively rigid support hook having a downwardly depending lip portion that fits into the window well of a vehicle in a well recognized manner; and, an outwardly projecting ledge portion from which are suspended both the horizontal and the vertical flexible support units.

The flexible vertical support unit comprises an elongated flexible strap member secured on one end to the outwardly projecting ledge portion of the rigid support unit, and having its free end provided with securing means.

The flexible horizontal support unit comprises a pair of adjustable flexible arm members having one end secured to opposite sides of the top portion of the vertical support unit; wherein the free ends of the flexible arm members are provided with securing means that cooperate to adjustably attach the arm members together and form an attachment surface for the free end of the vertical support unit.

As will be explained in greater detail further on in the specification the horizontal support unit is operatively employed to suspend and support a tapered drinking receptacle; and, both the horizontal and vertical support units are employed to suspend and support a conventional cylindrical drinking receptacle.

BRIEF DESCRIPTION OF THE DRAWINGS

These and other objects, advantages, and novel features of the invention will become apparent from the detailed description of the best mode for carrying out the preferred embodiment of the invention which follows; particularly when considered in conjunction with the accompanying drawings; wherein.

BEST MODE FOR CARRYING OUT THE INVENTION

Figure 1:
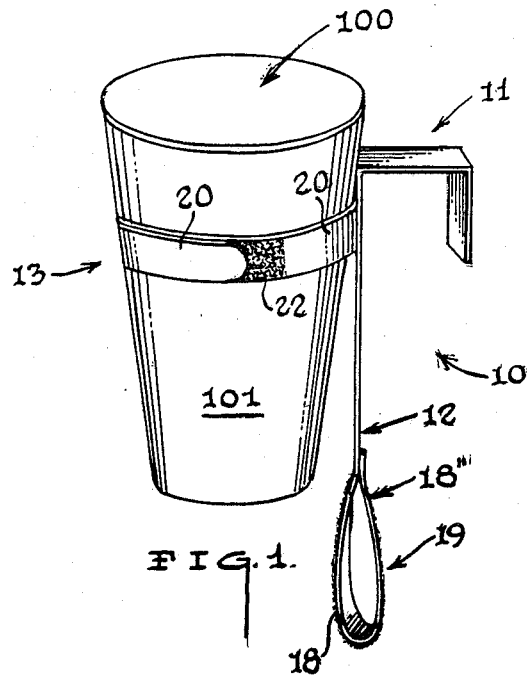
FIG. 1 is a perspective view of the cup holder engaged with a tapered drinking receptacle.

As can be seen by reference to the drawings and in particular to FIG. 1, the flexible drinking cup holder that forms the basis of the present invention is designated generally by the reference numeral (10). The drinking cup holder (10) comprises in general: a rigid support unit (11); a flexible vertical support unit (12); and, a flexible horizontal support unit (13). These units will now be described in seriatim fashion.

Figure 4:
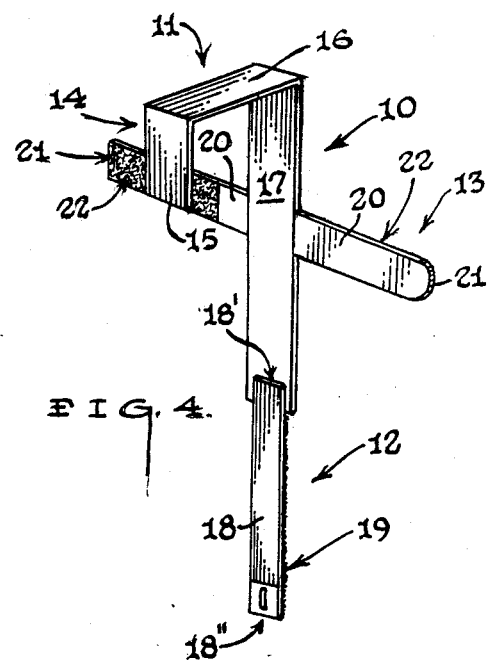

As can best be seen by reference to FIG. 4, the rigid support unit (11) comprises in general: a relatively rigid support hook (14) having a downwardly depending lip portion (15) that fits into the window well of a vehicle (not shown) in a well recognized manner; an outwardly projecting ledge portion (16); and, an elongated downwardly depending stem portion (17).

Figure 2:
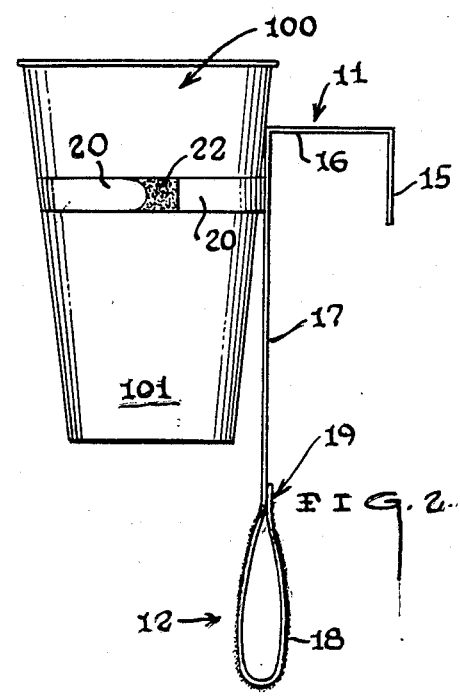
FIG. 2 is a side plan view of the holder engaging a tapered drinking receptacle.
Figure 3:
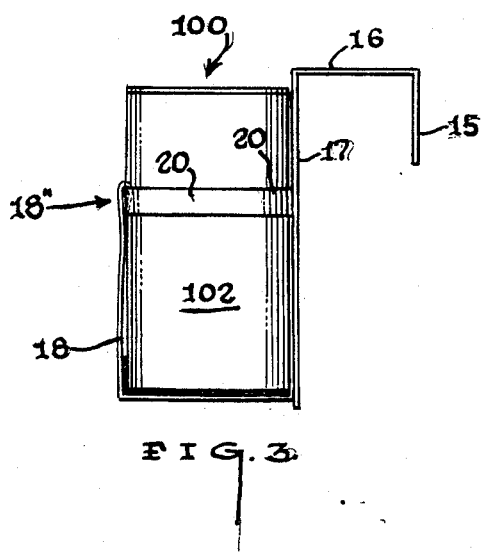
FIG. 3 a side plan view of the cup holder engaged with a cylindrical receptacle; and, FIG. 4 is an isolated rear perspective view of the drinking cup holder.

Still referring to FIG. 4 it can be seen that the flexible vertical support unit (12) comprises an elongated flexible strap member (18) secured on one end (18') to the stem portion (17) of the rigid support unit (11); wherein, the free end (18") of the strap member (18) is provided with securing means (19) wherein the free end (18") of the strap member (18) may be formed into a closed loop as depicted in FIGS. 1 thru 3.

As can also be seen by reference to FIG. 4, the flexible horizontal support unit (13) comprises a pair of adjustable and opposed horizontally disposed flexible arm members (20) operatively secured to the upper end of the stem portion (17) of the rigid support unit (11); wherein, opposite sides of the free ends (21) of the arm members (20) are provided with complimentary releasable securing means (22) such as conventional hook and loop fasteners, or the like to allow loops of various sizes to be formed by the opposed arm members to accommodated cups of various sizes.

Turning now particularly to FIGS. 1 and 2, it can be seen that when the cup holder (10) is used with a drink receptacle (100) such as a tapered cup (101) it is only necessary to engage the flexible horizontal support unit (13) with the periphery of the tapered cup (101); in as much as once the flexible arm members (20) frictionally engage the periphery of the tapered cup (101) the downward travel of the cup (101) relative to the holder (10) will be terminated in a well recognized fashion.

As can also be seen particularly by reference to FIG. 3, in those instances wherein the drink receptacle (100) comprises a generally cylindrical container (102) such as a soda can, or the like; it will be necessary to engage both the horizontal support unit (13) and the vertical support unit (12) in a sequential fashion both around and under the cylindrical the flexible arm members (20) together; and, then the free end (18") of the vertical support unit (12) is passed underneath the container (102) and formed into a loop that captively engages the joined flexible arm members (20) of the horizontal support unit (13).

Having thereby described the subject matter of this invention it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A flexible cup holder for drink receptacles including tapered cups and cylindrical containers wherein the cup holder comprises:
   a rigid support unit comprising a relatively rigid support hook having an inverted generally L-shaped configuration and including a downwardly depending lip portion and an outwardly projecting ledge portion and a downwardly depending stem portion;
   a flexible vertical support unit comprising an elongated flexible strap member connected on one end to said downwardly depending stem portion of the relatively rigid support hook; and
   a flexible horizontal support unit comprising a pair of opposed horizontally disposed flexible arm members operatively connected to the rigid support unit.

2. The cup holder as in claim 1 wherein said elongated flexible strap member has a free end which is provided with securing means whereby said free end may be formed into a closed loop having an adjustable circumference.

3. The cup holder as in claim 2 wherein said flexible arm members have free ends which are provided with cooperating securing means which allow the flexible arm members to be joined together to form a closed loop.

4. The cup holder as in claim 1 wherein said rigid support hook further includes:
   an elongated downwardly depending stem portion.

5. The cup holder as in claim 1 wherein said flexible arm members are operatively connected to the upper end of said stem portion; and, said one end of the flexible strap member is operatively connected to the lower end of the stem portion.

* * * * *